(12) United States Patent
Holt

(10) Patent No.: US 11,174,790 B2
(45) Date of Patent: Nov. 16, 2021

(54) GAS TURBINE ENGINE HAVING AN AIR-OIL HEAT EXCHANGER

(71) Applicant: ROLLS-ROYCE plc, London (GB)

(72) Inventor: James Holt, Kempston (GB)

(73) Assignee: ROLLS-ROYCE PLC, London (GB)

( * ) Notice: Subject to any disclaimer, the term of this patent is extended or adjusted under 35 U.S.C. 154(b) by 74 days.

(21) Appl. No.: 16/158,713

(22) Filed: Oct. 12, 2018

(65) Prior Publication Data

US 2019/0145317 A1 May 16, 2019

(30) Foreign Application Priority Data

Nov. 14, 2017 (GB) ...................................... 1718796

(51) Int. Cl.
*F02C 7/141* (2006.01)
*F02C 7/18* (2006.01)
*F01D 25/12* (2006.01)
*F01D 17/10* (2006.01)
(Continued)

(52) U.S. Cl.
CPC ............ *F02C 7/141* (2013.01); *F01D 17/105* (2013.01); *F01D 25/12* (2013.01); *F02C 7/18* (2013.01); *F02C 9/18* (2013.01); *F02K 3/075* (2013.01); *F05D 2260/20* (2013.01); *F05D 2260/606* (2013.01)

(58) Field of Classification Search
None
See application file for complete search history.

(56) References Cited

U.S. PATENT DOCUMENTS

| | | | | |
|---|---|---|---|---|
| 4,254,618 A | * | 3/1981 | Elovic ..................... | F02C 7/185 60/226.1 |
| 5,531,566 A | * | 7/1996 | Derouet ................ | F01D 17/105 415/144 |

(Continued)

FOREIGN PATENT DOCUMENTS

| | | |
|---|---|---|
| GB | 2 437 377 A | 10/2007 |
| WO | WO 2015/126551 A1 | 8/2015 |

OTHER PUBLICATIONS

Great Britain Search Report dated May 11, 2018, issued in GB Patent Application No. 1718796.4.
(Continued)

*Primary Examiner* — Steven M Sutherland
*Assistant Examiner* — Rodolphe Andre Chabreyrie
(74) *Attorney, Agent, or Firm* — Crowell & Moring LLP

(57) ABSTRACT

A gas turbine engine includes: a core engine surrounded by a core fairing; a propulsive fan; a nacelle surrounding the propulsive fan, the core fairing and the core engine; and a fan duct for receiving a bypass air flow accelerated by the propulsive fan, the fan duct being defined between the nacelle and the core fairing. The gas turbine engine further includes an air-oil heat exchanger for cooling engine oil using an air flow diverted from the bypass air flow, the heat exchanger being mounted behind a wall of the fan duct. The gas turbine engine further includes a flow passage which receives the diverted air flow at a first location in the fan duct, delivers the diverted air flow to the heat exchanger, and returns the diverted air flow to the fan duct at a second location which is downstream of the first location.

6 Claims, 2 Drawing Sheets

(51) Int. Cl.
*F02K 3/075* (2006.01)
*F02C 9/18* (2006.01)

(56) References Cited

U.S. PATENT DOCUMENTS

| | | | | |
|---|---|---|---|---|
| 5,729,969 A * | 3/1998 | Porte | ............... | F02C 6/08 60/226.1 |
| 7,758,303 B1 * | 7/2010 | Wadia | ............... | F01D 5/022 415/77 |
| 8,763,363 B2 * | 7/2014 | Ranganathan | ........ | F01D 25/125 165/121 |
| 8,833,053 B2 * | 9/2014 | Chir | ............... | F02C 6/08 60/39.5 |
| 8,967,958 B2 * | 3/2015 | Bajusz | ............... | F02C 7/14 415/178 |
| 10,036,329 B2 * | 7/2018 | Suciu | ............... | F02K 3/115 |
| 2007/0235080 A1 | 10/2007 | Hocking | | |
| 2008/0053059 A1 | 3/2008 | Olver et al. | | |
| 2009/0097972 A1 | 4/2009 | Murphy | | |
| 2010/0180571 A1 | 7/2010 | Zysman et al. | | |
| 2011/0262270 A1 | 10/2011 | Lore et al. | | |
| 2012/0168115 A1 * | 7/2012 | Raimarckers | ........ | F01D 25/02 165/41 |
| 2015/0247462 A1 * | 9/2015 | Suciu | ............... | F02K 3/04 415/1 |
| 2016/0024964 A1 | 1/2016 | Weiner | | |
| 2016/0146113 A1 * | 5/2016 | Zatorski | ........ | F02K 1/70 415/151 |
| 2016/0326903 A1 * | 11/2016 | Xu | ............... | F01D 25/12 |
| 2016/0369697 A1 | 12/2016 | Schwarz et al. | | |

OTHER PUBLICATIONS

European Search Report, issued in European Application 18199833.7, dated Apr. 5, 2019, pp. 1-7, European Patent Office, Munich.

* cited by examiner

GAS TURBINE ENGINE HAVING AN AIR-OIL HEAT EXCHANGER

CROSS-REFERENCE TO RELATED APPLICATIONS

This specification is based upon and claims the benefit of priority from UK Patent Application Number GB 1718796.4 filed on Nov. 14, 2017, the entire contents of which are incorporated herein by reference.

BACKGROUND

Field of the Disclosure

The present disclosure relates to a gas turbine engine having an air-oil heat exchanger.

Description of the Related Art

Oil is used in gas turbine engines to lubricate and cool electrical generators, bearings and gears in the transmission system. This results in a large amount of heat being transferred to the oil. In order to maintain the oil, and the components that the oil is cooling, at acceptable temperatures, it is necessary to remove this heat.

In a geared turbofan engine, for example, the power gearbox which transfers power to the engine's propulsive fan has demanding cooling requirements. One approach for managing the temperature of the engine's lubricating oil is to mount one or more air/oil heat exchangers (e.g. matrix air-cooled oil cooler (MACOCs)) to the engine core inside the core fairing. Such a heat exchanger can use the bypass air flow through the engine's bypass duct as a source of and sink for cooling air. Thus a key consideration for the proper functioning of the heat exchanger is that there should be adequate air-side pressure differential across the heat exchanger to drive air flow therethrough. Without an adequate differential, cooling of the engine oil can be compromised.

Accordingly, the heat exchanger can be axially positioned relative to the bypass duct to maximise the pressure differential and/or it can be configured to have a low air side pressure loss characteristic. However, even when such steps are taken there is a risk at low power engine operating conditions (e.g. ground idle) of a pressure gradient being generated along the core fairing which does not provide an adequate pressure drop across the heat exchanger to drive air through it.

To mitigate this risk, one strategy is to exhaust the cooling air from the heat exchanger to the core zone ventilation nozzle, as this has a lower exhaust pressure. However, the core zone ventilation nozzle is generally less aerodynamically efficient than the "cold nozzle" at the end of the bypass duct. Also exhausting the cooling air to the core zone ventilation nozzle may be unattractive due to the amount of additional of ducting that would be required. Another strategy is to provide an ejector supplied with core compressor air in the exhaust ducting of the heat exchanger, and use this to draw air through the heat exchanger when required (e.g. at low power conditions). However, this can produce additional noise, and would also require complicated additional ducting.

SUMMARY

According to a first aspect, there is provided a gas turbine engine including:

a core engine surrounded by a core fairing;
a propulsive fan;
a nacelle surrounding the propulsive fan, the core fairing and the core engine; and
a fan duct for receiving a bypass air flow accelerated by the propulsive fan, the fan duct being defined between the nacelle and the core fairing;
an air-oil heat exchanger for cooling engine oil using an air flow diverted from the bypass air flow, the heat exchanger being mounted behind a wall of the fan duct;
a flow passage which receives the diverted air flow at a first location in the fan duct, delivers the diverted air flow to the heat exchanger, and returns the diverted air flow to the fan duct at a second location which is downstream of the first location;
wherein the engine further includes a deflector which is movable between a deployed position in which, at lower flow rates of the bypass air flow, it is deployed from the wall of the fan duct to deflect the bypass air flow away from the second location and thereby locally reduce the pressure in the fan duct adjacent the second location, and a stowed position in which, at higher flow rates of the bypass air flow, it is stowed to the wall of the fan duct.

Thus the deflector provides a means to generate sufficient pressure difference across the heat exchanger at low power engine operating conditions, such as ground idle. The deflector can be a relatively simple device that avoids the disadvantages of the alternative strategies discussed above. Moreover, by being movable to the stowed position it can avoid incurring a specific fuel consumption penalty at cruise, and higher power, operating conditions.

The engine may have any one or, to the extent that they are compatible, any combination of the following optional features.

Conveniently, the heat exchanger may be mounted inside the core fairing. However, another option is for the heat exchanger to be mounted inside an aerofoil body which traverses the fan duct between the nacelle and the core fairing. For example, such an aerofoil body can be a "lower bifurcation" located at bottom dead centre of the fan duct, and typically carrying pipes and harnesses which extend between the core engine and a fan case of the engine.

The deflector may be biased (e.g. spring biased) to the deployed position and may be urged to the stowed position at the higher flow rates of the bypass air flow by aerodynamic force of the bypass air flow impinging thereon. This arrangement therefore provides a means of passively controlling the deflector so that it is deployed only when needed. This does not exclude, however, that the engine may have e.g. a controller and actuator arrangement for active control of the deployment of the deflector.

Conveniently, the deflector may be formed as panel in the wall of the fan duct, the panel being pivotably rotatable about a front edge thereof to move between the deployed position and the stowed position.

The wall of the fan duct may have a recess which receives the deflector in the stowed position such that the deflector is flush with the wall.

The air-oil heat exchanger may be a matrix air-cooled oil cooler.

The gas turbine engine may be a geared fan gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments of the present disclosure will now be described by way of example with reference to the accompanying drawings in which.

DETAILED DESCRIPTION

Figure 1:
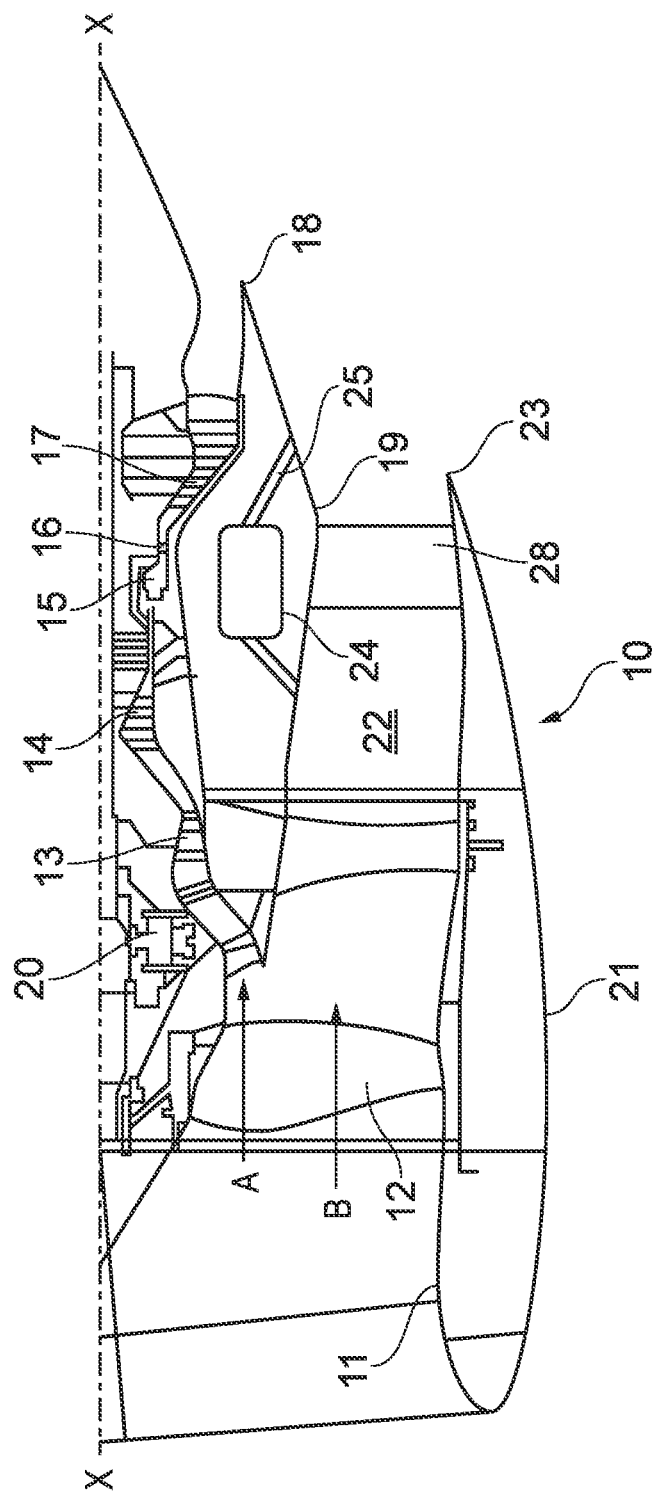
FIG. 1 shows a half longitudinal cross-section through a geared turbofan gas turbine engine.

With reference to FIG. 1, a geared turbofan gas turbine engine is generally indicated at 10 and has a principal and rotational axis X-X. The engine comprises, in axial flow series, an air intake 11, a propulsive fan 12, a low pressure compressor 13, a high-pressure compressor 14, combustion equipment 15, a high-pressure turbine 16, a low-pressure turbine 17 and a core engine exhaust nozzle 18. A core fairing 19 surrounds the core engine from the low pressure compressor 13 to the exhaust nozzle 18. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the low-pressure compressor 13 and a second air flow B which passes through the bypass duct 22 to provide propulsive thrust. The low-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high and low-pressure turbines 16, 17 before being exhausted through the nozzle 18 to provide additional propulsive thrust. The high and low-pressure turbines respectively drive the high and low-pressure compressors 14, 13 by suitable interconnecting shafts. The fan 12 is driven via a power gearbox 20 from the low-pressure shaft.

Other gas turbine engines to which the present disclosure may be applied may have alternative configurations. By way of example such engines may have an alternative number of interconnecting shafts (e.g. three) and/or an alternative number of compressors and/or turbines. Further, the fan may be driven directly by an interconnecting shaft from a turbine rather than via a gearbox.

To cool the oil used in the engine, one or more matrix air-cooled oil cooler (MACOCs) 24 are mounted to the core engine inside the core fairing 19. The, or each, MACOC uses an air flow diverted from the bypass air flow via a flow passage 25 which receives the diverted air flow at a first (upstream) location in the fan duct 22 and returns the diverted air flow at a second (downstream) location in duct.

Figure 2A:
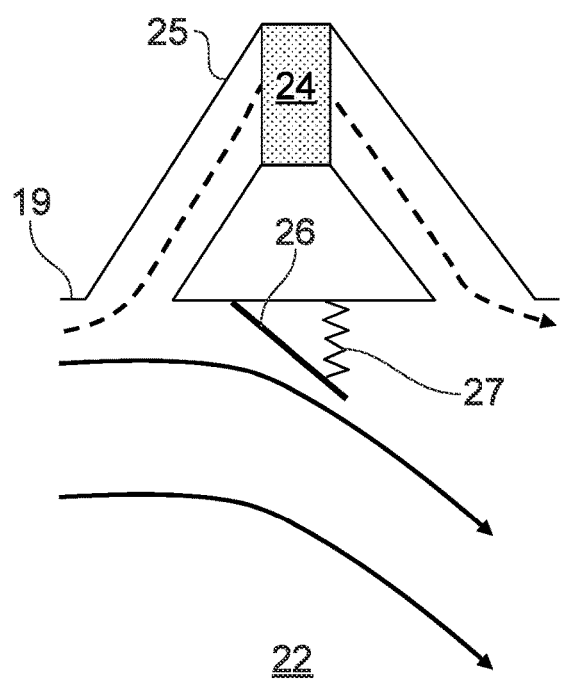
FIG. 2A shows schematically a matrix air-cooled oil cooler of the engine of FIG. 1 at a low engine power operating condition; and, FIG. 2B shows schematically the matrix air-cooled oil cooler at a high engine power operating condition.
Figure 2B:
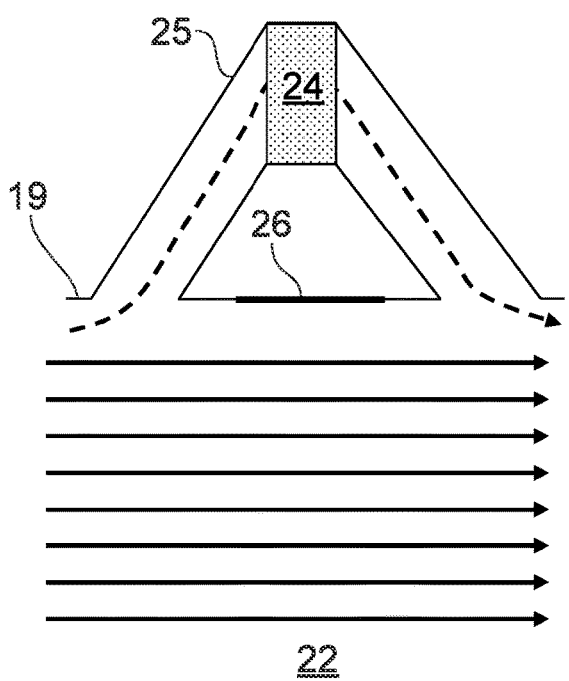

FIG. 2A shows schematically the MACOC 24 and flow passage 25 at a low engine power operating condition, and FIG. 2B shows schematically the same at a high engine power operating condition. In order to generate sufficient pressure difference across the MACOC 24 at low power engine operating conditions, the MACOC has an aerodynamic deflector 26 at the wall of the core fairing 19 between the first and second locations at which the flow passage receives and returns the diverted air flow.

The deflector 26 is in the form of a panel which rotatably pivots about a front edge. The deflector is biased by a spring mechanism 27 to a deployed position (FIG. 2A). At low engine power operating conditions, the corresponding low flow rates of the bypass air flow through the bypass duct 22 exert insufficient aerodynamic force to counteract this spring bias. Accordingly, the bypass air flow (indicated by continuous, arrowed lines) is deflected away from the downstream location at which the passage 25 returns the diverted air flow to the duct. This induces a region of low pressure in the duct adjacent the downstream location, which in turn ensures an adequate pressure differential to draw the diverted air flow (indicated by a dashed, arrowed line) through the MACOC 24.

At higher engine power operating conditions, the corresponding high flow rates of the bypass air flow through the bypass duct 22 now exert sufficient aerodynamic force to counteract the bias produced by the spring mechanism 27, thereby rotating the deflector 26 to a stowed position (FIG. 2B) in which it stowed to the core fairing 19. For example, the deflector can be stowed into a matching recess formed in the wall of the core fairing in order to lie flush with the annulus line of the bypass duct. The bypass air flow (now indicated by more numerous continuous, arrowed lines) is no longer disturbed by being deflected away from the downstream location at which the passage returns the diverted air flow to the duct, but the increased axial pressure gradient along the surface of the core fairing is enough to draw the diverted air flow through the MACOC 24.

In this way, the deployment of the deflector 26 can be automatically and passively controlled such that it does not exert a specific fuel consumption penalty at cruise (and other higher power design points).

In a variant of the engine, the MACOC 24 can be mounted inside the lower bifurcation 28, which extends as an aerofoil body across bottom dead centre of the fan duct for the transport of pipes, harnesses etc. The inlet to and outlet from the flow passage 25 are then on the same side of the lower bifurcation, but the inlet is closer to the lower bifurcation's leading edge and the outlet closer to its trailing edge. Advantageously, in this location the pressure drop across the MACOC is less affected by boundary layers than at the core fairing wall of the bypass duct.

While the invention has been described in conjunction with the exemplary embodiments described above, many equivalent modifications and variations will be apparent to those skilled in the art when given this disclosure. Except where mutually exclusive, any of the features may be employed separately or in combination with any other features and the disclosure extends to and includes all combinations and sub-combinations of one or more features described herein. Accordingly, the exemplary embodiments of the invention set forth above are considered to be illustrative and not limiting. Various changes to the described embodiments may be made without departing from the spirit and scope of the invention.

I claim:

1. A gas turbine engine including:
a core engine surrounded by a core fairing;
a propulsive fan;
a nacelle surrounding the propulsive fan, the core fairing and the core engine;

a fan duct for receiving a bypass air flow accelerated by the propulsive fan, the fan duct being defined between the nacelle and the core fairing;

an air-oil heat exchanger for cooling engine oil using an air flow diverted from the bypass air flow, the heat exchanger being mounted behind a wall of the fan duct;

a flow passage which receives the diverted air flow at an inlet in the fan duct, delivers the diverted air flow to the heat exchanger, and returns the diverted air flow to the fan duct at an outlet which is downstream of the inlet;

a deflector movable between a deployed position and a stowed position, wherein in the deployed position, the deflector is deployed from the wall of the fan duct and is in a position to deflect the bypass air flow away from the outlet and thereby locally reduce a pressure in the fan duct adjacent the outlet, in the stowed position, the deflector is stowed to the wall of the fan duct, and the deflector in the deployed and stowed positions is between the inlet and the outlet without covering the inlet and the outlet; and the deflector comprising a panel pivotably rotatable about a front edge of the panel to move between the deployed position and the stowed position, the front edge located upstream, relative to the bypass air flow, of a back edge of the panel, wherein the back edge of the panel projects into the bypass air flow in the deployed position, and the deflector is configured to be urged to the stowed position due to an aerodynamic force from impingement of the bypass air flow upon the panel of the deflector, wherein the deflector is spring biased to the deployed position.

2. The gas turbine engine as claimed in claim 1, wherein the heat exchanger is mounted inside the core fairing.

3. The gas turbine engine as claimed in claim 1, wherein the heat exchanger is mounted inside an aerofoil body which traverses the fan duct between the nacelle and the core fairing.

4. The gas turbine engine as claimed in claim 1 in which the wall of the fan duct has a recess configured to receive the deflector in the stowed position such that the deflector is flush with the wall.

5. The gas turbine engine as claimed in claim 1, wherein the air-oil heat exchanger is a matrix air-cooled oil cooler.

6. The gas turbine engine as claimed in claim 1 which is a geared fan gas turbine engine.

\* \* \* \* \*